M. D. WILLIAMS.
COW YOKE.
APPLICATION FILED JUNE 18, 1913.
1,202,942.
Patented Oct. 31, 1916.
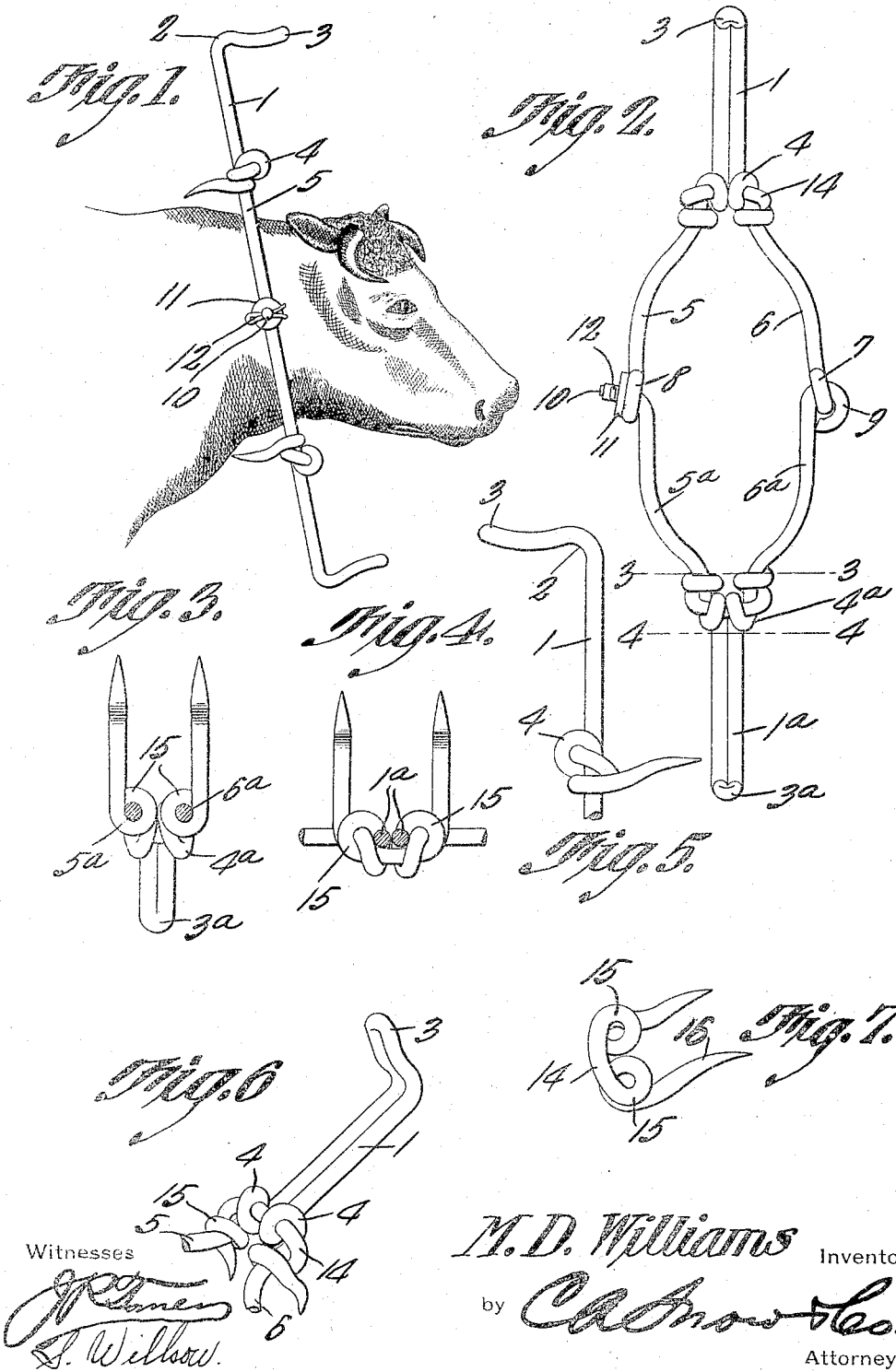

UNITED STATES PATENT OFFICE.

MALVIN D. WILLIAMS, OF WALTER, OKLAHOMA.

COW-YOKE.

1,202,942.  Specification of Letters Patent.  Patented Oct. 31, 1916.

Application filed June 18, 1913. Serial No. 774,452.

*To all whom it may concern:*

Be it known that I, MALVIN D. WILLIAMS, a citizen of the United States, residing at Walter, in the county of Cotton and State of Oklahoma, have invented a new and useful Cow-Yoke, of which the following is a specification.

The device forming the subject matter of this application is a yoke adapted to be used upon cows and other animals.

One object of the invention is to provide novel means for connecting the prongs of the yoke with the neck engaging members thereof.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 is a side elevation, showing the yoke in position; Fig. 2 is an elevation of the yoke; Fig. 3 is a cross section on the line 3—3 of Fig. 2; Fig. 4 is a cross section on the line 4—4 of Fig. 2; Fig. 5 is a side elevation of the yoke, parts being broken away; Fig. 6 is a perspective of one end of the yoke; Fig. 7 is a perspective of the prong.

The yoke herein disclosed comprises a pair of coöperating members of substantially identical construction. Each of these members is fashioned from a single piece of material, bent upon itself to form a loop, the loop being flattened to form a shank 1, the constituent parts of which are in contact. One end of the shank 1 is bent as indicated at 2 to form a forwardly extended stop 3. In the side portions of the shank 1, eyes 4 are formed by twisting the side portions of the shank upon themselves. The side portions of the shank 1 are prolonged to form diverging arms 5 and 6, the arms 5 and 6 being provided, respectively, with eyes 8 and 7 which lie at right angles to the plane defined by the arms 5 and 6. The other member of the yoke is of substantially the same construction as that of the member last above described. The parts of this second member are denoted by reference characters heretofore used, with the suffix "a". One arm $6^a$, however, is bent to form an eye 9 lying parallel to the plane defined by the arms $5^a$ and $6^a$, the eye 9 being pivotally assembled with the eye 7. The other arm $5^a$ of the last specified member of the yoke is bent laterally to form a finger 10, the finger 10 passing through the eye 8. Mounted upon the finger 10 is a washer 11 which bears against the outer face of the eye 8, and a cotter pin 12 is inserted through the finger 10 to hold the parts assembled.

An arched prong bearing member, shown in Fig. 7, is provided, and since the prong bearing members are mounted in the same manner in both members of the yoke, the mounting of one prong bearing member only will be considered.

Each prong bearing member comprises a central portion 14, twisted upon itself to form convolutions 15, the convolutions being extended to form substantially parallel prongs 16. The central portion 14 of one prong bearing member passes through the eyes $4^a$ or 4, the convolutions 15 being engaged around the arms 5 and 6 or $5^a$ and $6^a$, the prongs 16 projecting outwardly, in a direction substantially at right angles to the planes defined by the respective arms. The prong bearing members serve to hold the constituent elements of the shanks 1 and $1^a$ together, and owing to the peculiar interlocking relation existing between the prong bearing members and the body portions of the yoke, the prong bearing members cannot slide longitudinally.

Having thus described the invention, what is claimed is:—

In an animal yoke, a pair of neck engaging members, each comprising, in a one piece structure, a loop-shaped shank and arms diverging from the shank, the ends of the arms of the respective members being pivotally connected with each other, the side portions of the shank of one member being bent to form eyes standing approximately at right angles to the plane defined by the arms of said member; a binding element extended through the eyes and twisted around the arms of said member to hold the same against separation, the ends of the binding element being prolonged to form projecting prongs.

In testimony that I claim the foregoing as my own, I have hereto affixed my signature in the presence of two witnesses.

MALVIN D. WILLIAMS.

Witnesses:
GEO. W. GRAHAM, Jr.,
W. S. WARD.